United States Patent
Zuraski, Jr. et al.

(10) Patent No.: US 6,502,188 B1
(45) Date of Patent: Dec. 31, 2002

(54) DYNAMIC CLASSIFICATION OF CONDITIONAL BRANCHES IN GLOBAL HISTORY BRANCH PREDICTION

(75) Inventors: Gerald D. Zuraski, Jr., Austin, TX (US); James S. Roberts, Austin, TX (US); Raghuram S. Tupuri, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/441,630

(22) Filed: Nov. 16, 1999

(51) Int. Cl.[7] .............................. G06F 9/40; G06F 9/42; G06F 9/305
(52) U.S. Cl. ................... 712/234; 712/239; 712/240; 712/207; 711/125
(58) Field of Search ........................... 712/239, 230, 712/240, 233, 234, 235, 236, 237, 238, 241, 243, 245, 207; 711/125

(56) References Cited

U.S. PATENT DOCUMENTS

| | | | |
|---|---|---|---|
| 4,179,737 A | 12/1979 | Kim | 712/241 |
| 4,860,197 A | 8/1989 | Langendorf et al. | 712/238 |
| 5,142,634 A | 8/1992 | Fite et al. | 712/240 |
| 5,265,213 A | 11/1993 | Weiser et al. | 712/240 |
| 5,367,703 A | 11/1994 | Levitan | 712/240 |
| 5,381,533 A | 1/1995 | Peleg et al. | 712/215 |
| 5,454,117 A | 9/1995 | Puziol et al. | 712/23 |
| 5,553,253 A | 9/1996 | Pan et al. | 712/240 |
| 5,553,254 A | 9/1996 | Berstis et al. | 712/207 |
| 5,592,634 A | 1/1997 | Circello et al. | 712/239 |

(List continued on next page.)

FOREIGN PATENT DOCUMENTS

| | | |
|---|---|---|
| EP | 0 199 947 | 11/1986 |
| EP | 0 394 711 | 10/1990 |
| EP | 0 586 057 | 3/1994 |
| EP | 0 605 876 | 7/1994 |
| GB | 2 285 526 | 7/1995 |
| WO | 93/17385 | 9/1993 |
| WO | 98/22873 | 5/1998 |

OTHER PUBLICATIONS

Calder et al., "Next Cache Line and Set Prediction," Computer Architecture News, vol. 23, No. 2, May 1995, pp. 287–296.
McFarling, "Combining Branch Predictors," WRL Technical Note TN–36, Jun. 1993, pp. 1–20.
Kaiser, "K7 Branch Prediction," © 1999 by Andrea Kaiser, 4 pgs.
Diefendorff, "Athlon Outruns Pentium III," Microprocessor Report, vol. 13, No. 11, Aug. 1999, 7 pgs.

Primary Examiner—Daniel H. Pan
(74) Attorney, Agent, or Firm—Rory D. Rankin; Lawrence J. Merkel

(57) ABSTRACT

A branch prediction unit includes a local branch prediction and a global branch prediction. A global branch prediction utilizes a global history shift register to record the behavior of conditional branches. In some cases, a conditional branch may behave in a static manner, either always being taken or not taken, while resident in an instruction cache. Such static behaving conditional branches do not need a global history for prediction and contend with other conditional branches for global branch history training. By utilizing a dynamic branch classification scheme, branches requiring global history prediction can be identified and static behaving conditional branches may be prevented from polluting the global history. All conditional branches are initially classified as local and do not participate in global history training. Only after two mispredictions are branches recognized as exhibiting dynamic behavior and classified as global. These branches classified as global may then participate in global history training and utilize a global history based branch prediction.

19 Claims, 13 Drawing Sheets

U.S. PATENT DOCUMENTS

| | | | |
|---|---|---|---|
| 5,608,886 A | 3/1997 | Blomgren et al. | 712/239 |
| 5,642,500 A | 6/1997 | Inoue | 712/233 |
| 5,649,137 A | 7/1997 | Favor et al. | 712/207 |
| 5,649,178 A | 7/1997 | Blaner et al. | 712/240 |
| 5,692,168 A | 11/1997 | McMahan | 712/237 |
| 5,708,803 A | 1/1998 | Ishimi et al. | 712/233 |
| 5,732,253 A | 3/1998 | McMahan | 712/239 |
| 5,737,590 A | 4/1998 | Hara | 712/238 |
| 5,758,142 A * | 5/1998 | McFaring et al. | 712/239 |
| 5,764,946 A | 6/1998 | Tran et al. | 712/239 |
| 5,794,028 A | 8/1998 | Tran | 712/240 |
| 5,822,574 A | 10/1998 | Tran | 712/233 |
| 5,822,575 A | 10/1998 | Tran | 712/239 |
| 5,864,707 A | 1/1999 | Tran et al. | 712/23 |
| 5,881,278 A | 3/1999 | Tran et al. | 712/238 |
| 5,954,816 A | 9/1999 | Tran et al. | 712/239 |
| 5,961,638 A | 10/1999 | Tran | 712/239 |
| 5,978,906 A | 11/1999 | Tran | 712/239 |
| 5,995,749 A | 11/1999 | Tran | 712/239 |
| 6,055,630 A * | 4/2000 | D'Sa et al. | 712/240 |
| 6,253,316 B1 | 6/2001 | Tran et al. | 712/239 |

* cited by examiner

Branch Classification Update

| | 1 | 2 | 3 | 4 | 5 | 6 | 7 | 8 |
|---|---|---|---|---|---|---|---|---|
| A | 1 | 0 | 0 | 1 | 1 | 0 | 1 | 0 |
| B | 0 | 0 | 1 | 1 | 0 | 1 | 0 | 1 |
| C | 0 | 1 | 1 | 0 | 1 | 0 | 1 | 0 |

Fig. 4 — Correct Prediction

| | 1 | 2 | 3 | 4 | 5 | 6 | 7 | 8 |
|---|---|---|---|---|---|---|---|---|
| A | 1 | 0 | 0 | 1 | 1 | 0 | 1 | 0 |
| B | 0 | 0 | 1 | 1 | 0 | 1 | 0 | 1 |
| C | 0 | 0 | 1 | 1 | 1 | 1 | 0 | 0 |

Fig. 5 — Misprediction Update

| | 1 | 2 | 3 | 4 | 5 | 6 | 7 | 8 |
|---|---|---|---|---|---|---|---|---|
| A | 1 | 0 | 0 | 1 | 1 | 0 | 1 | 0 |
| B | 0 | 1 | 1 | 0 | 1 | 0 | 1 | 1 |
| C | 0 | 0 | 1 | 1 | 0 | 1 | 0 | 0 |

Fig. 6 — Misprediction Repair

| | 1 | 2 | 3 | 4 | 5 | 6 | 7 | 8 |
|---|---|---|---|---|---|---|---|---|
| A | 1 | 0 | 0 | 1 | 1 | 0 | 1 | 0 |
| B | 0 | 1 | 1 | 0 | 1 | 0 | 1 | 0 |
| C | 0 | 0 | 1 | 0 | 0 | 1 | 0 | 0 |

Fig. 7 — Misprediction Repair

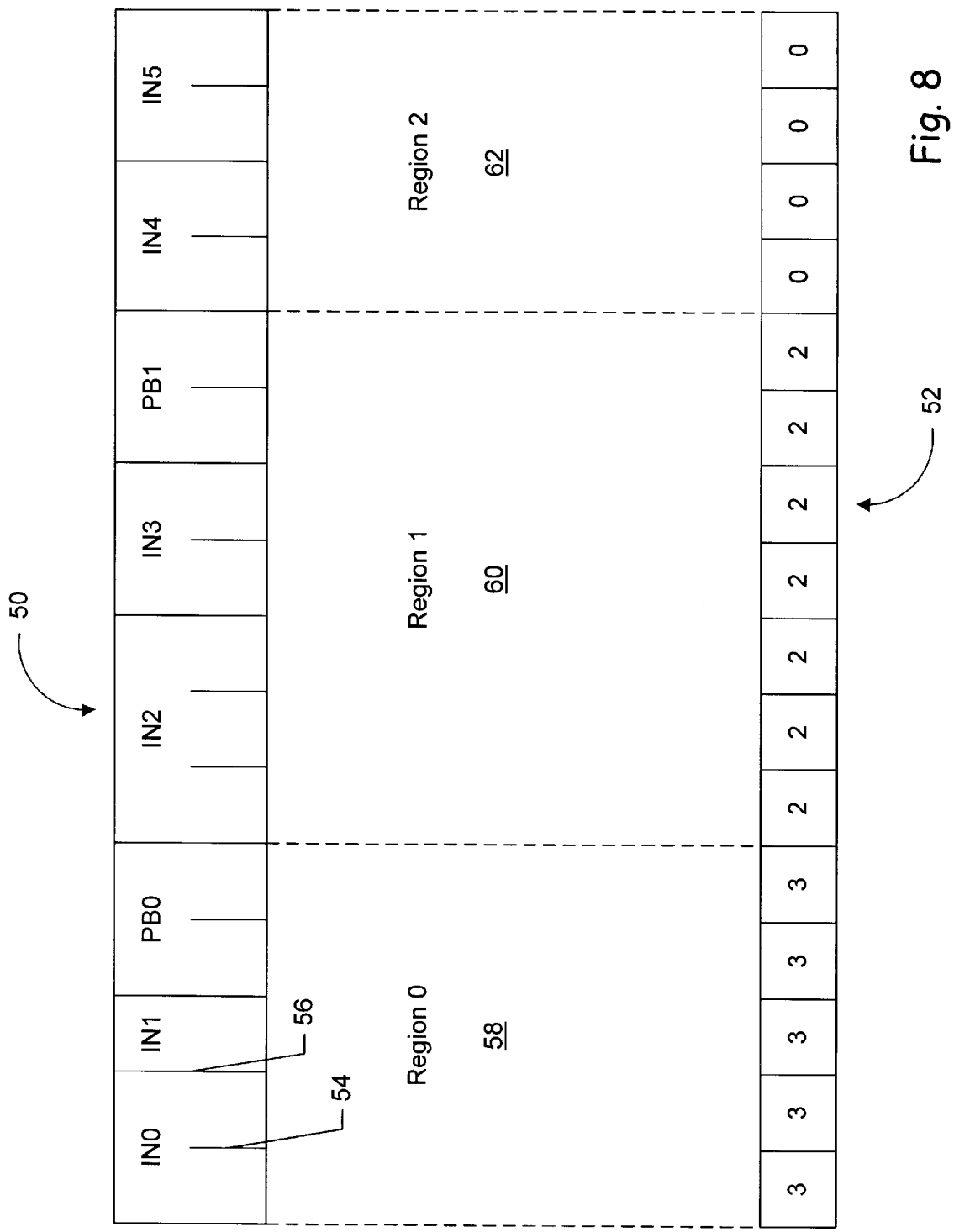

| Byte Position | 0 | 1 | 2-3 | 4-5 | 6-7 | 8-9 | A-B | C-D | E-F |
|---|---|---|---|---|---|---|---|---|---|
| Branch Selector Position | 0 | 1 | 2 | 3 | 4 | 5 | 6 | 7 | 8 |
| Read Addresses | 0000 | 0001 | 001x | 010x | 011x | 100x | 101x | 110x | 111x |
| Encoding Addresses | 0000 | 0001 0010 | 0011 0100 | 0101 0110 | 0111 1000 | 1001 1010 | 1011 1100 | 1101 1110 | 1111 |

| Byte Position | E | F | 0 | 1 |
|---|---|---|---|---|
| Instruction | IN0 | PB0 | | IN1 |
| Branch Selector | 0 | | 3 | 2 |

| Byte Position | 2 | 3 | 4 | 5 |
|---|---|---|---|---|
| Instruction | IN0 | PB0 | | RET |
| Branch Selector | 3 | | 1 | |

| Byte Position | 2 | 3 | 4 | 5 |
|---|---|---|---|---|
| Instruction | PB0 | | RET | IN1 |
| Branch Selector | 3 | | 0 | 0 |

Fig. 13 ← 84

| Byte Position | 3 | 4 | 5 | 6 | 7 | 8 |
|---|---|---|---|---|---|---|
| Instruction | IN0 | RET | PB0 | | | IN1 |
| Branch Selector | 1 | 3 | | 0 | | 0 |

Fig. 14 ← 86

Branch Selector Encoding

| Encoding (Binary) | Branch Prediction |
|---|---|
| 00 | Sequential |
| 01 | Return Stack |
| 10 | Branch Prediction 1 |
| 11 | Branch Prediction 2 |

DYNAMIC CLASSIFICATION OF CONDITIONAL BRANCHES IN GLOBAL HISTORY BRANCH PREDICTION

BACKGROUND OF THE INVENTION

1. Field of the Invention

This invention is related to the field of superscalar microprocessors and, more particularly, to the classification of conditional branches in branch prediction.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. Unconditional branch instructions always branch to the target address, while conditional branch instructions may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. Among the methods used to predict branches are local branch prediction and global branch prediction.

Local branch prediction involves making a prediction based on the behavior of a particular branch the past few times it was executed. Local branch prediction is effective for branches exhibiting repetitive patterns. On the other hand, global branch prediction involves making a branch prediction based on the history of the last few branches to have been executed. Global branch prediction is useful when the behavior of a branch is related to the behavior of the prior executed branches.

One problem with global branch prediction schemes is they do not account for branches that do not require a global history for prediction. Typically, all conditional branches participate in global history counter training. While some branches may be conditional, they may in fact exhibit static behavior by always being either taken or not taken. Such branches do not need a global history for prediction and contend with other conditional branches for history counter training. Consequently, the global prediction is in effect polluted by the training of branches which behave in a static manner.

SUMMARY OF THE INVENTION

The problems outlined above are in large part solved by a microprocessor and method as described herein. When a conditional branch is initially detected, it is classified as local and predicted not taken. If the branch is then actually taken, its prediction is changed to taken. If the branch is then actually not taken, its classification is changed to global, uses global branch prediction and participates in global history counter training. Advantageously, branches which exhibit static behavior may not participate in global history counter training. Instead, branches which are not taken may remain classified as local and not taken. Branches which are taken may remain classified as local and taken.

Broadly speaking, a branch prediction mechanism is contemplated comprising a local branch prediction storage, a global branch prediction storage, a branch target storage and a selection device. The local branch prediction storage receives a fetch address corresponding to a contiguous group of instructions and conveys a local branch prediction. The global branch prediction storage receives a fetch address and a global history which form an index for selecting a global prediction from the global prediction storage. The branch target storage also receives a fetch address is configured to store branch target addresses and classification indicators for classifying branches. This classification indicator is initially set to indicate the branch is local, but may be updated. Finally, a selection device is included for selecting either the local branch prediction or the global branch prediction in response to the classification conveyed by the classification indicator.

Also contemplated is a method comprising detecting that an instruction is a conditional branch. Upon such detection, a local branch prediction corresponding to the conditional branch is initialized to indicate the branch is predicted not taken. If the branch is then mispredicted, the local branch prediction is updated to indicate the branch is now predicted taken. In addition, the branch is classified as local. Finally, if the branch is again mispredicted, the branch classification is updated to indicate the branch is classified as global.

BRIEF DESCRIPTION OF THE DRAWINGS

Other objects and advantages of the invention will become apparent upon reading the following detailed description and upon reference to the accompanying drawings in which:

FIGS. 4–7 illustrate updating of a global history shift register.

FIGS. 8–9 show two embodiments of a group of contiguous bytes of instructions and corresponding branch selectors.

FIGS. 11–14 illustrate various end byte encodings for branch selectors.

FIG. 15 is a table illustrating one embodiment of branch selector encoding.

Figure 1:
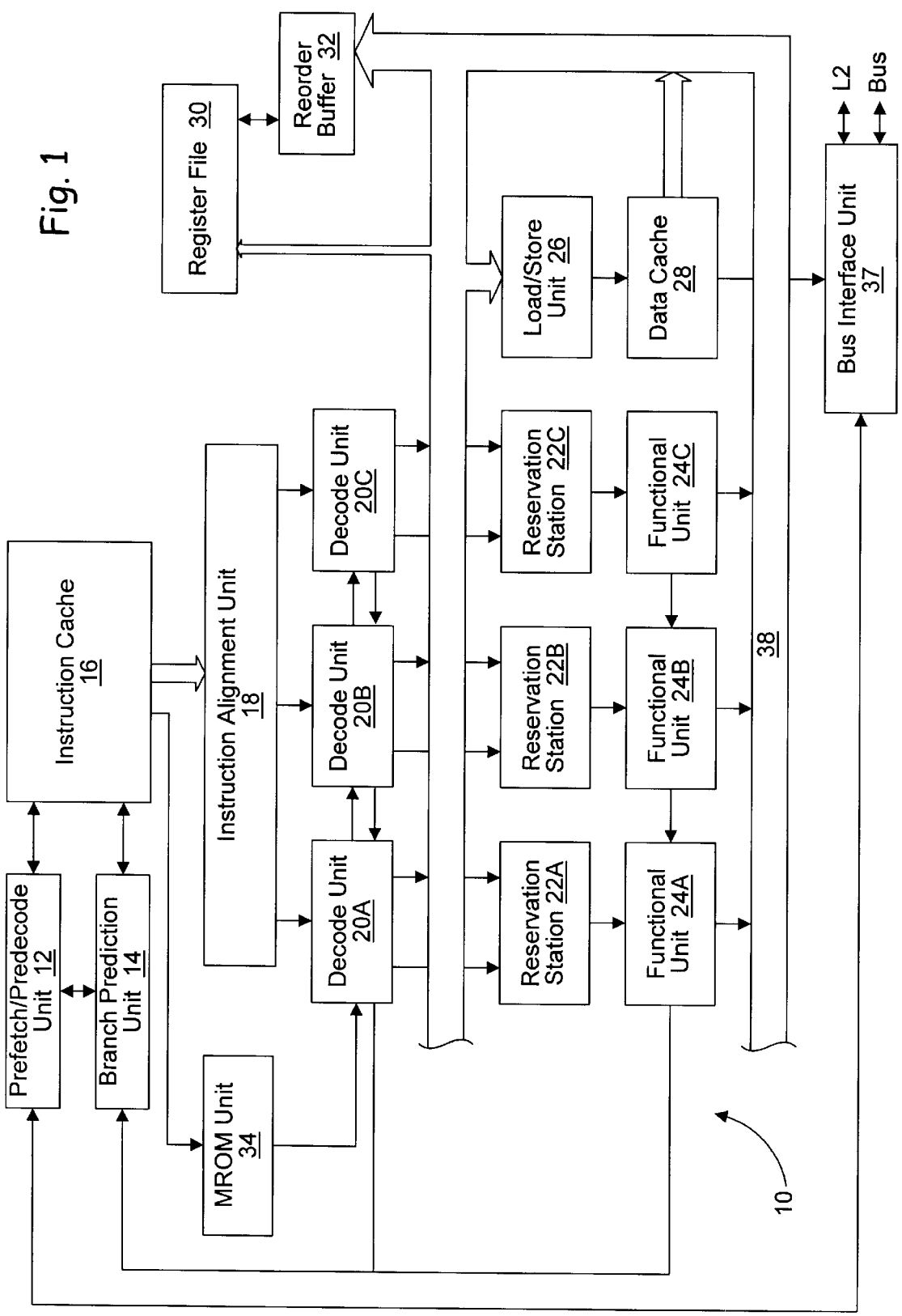
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14 Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12 Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod RIM byte, and an immediate byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18 Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. In one embodiment, reorder buffer 32 includes a future file which receives operand requests from decode units as well. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are issued by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10, including using a future file to store the speculative state of register file 30.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV -6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Branch Classification Update

Figure 2:
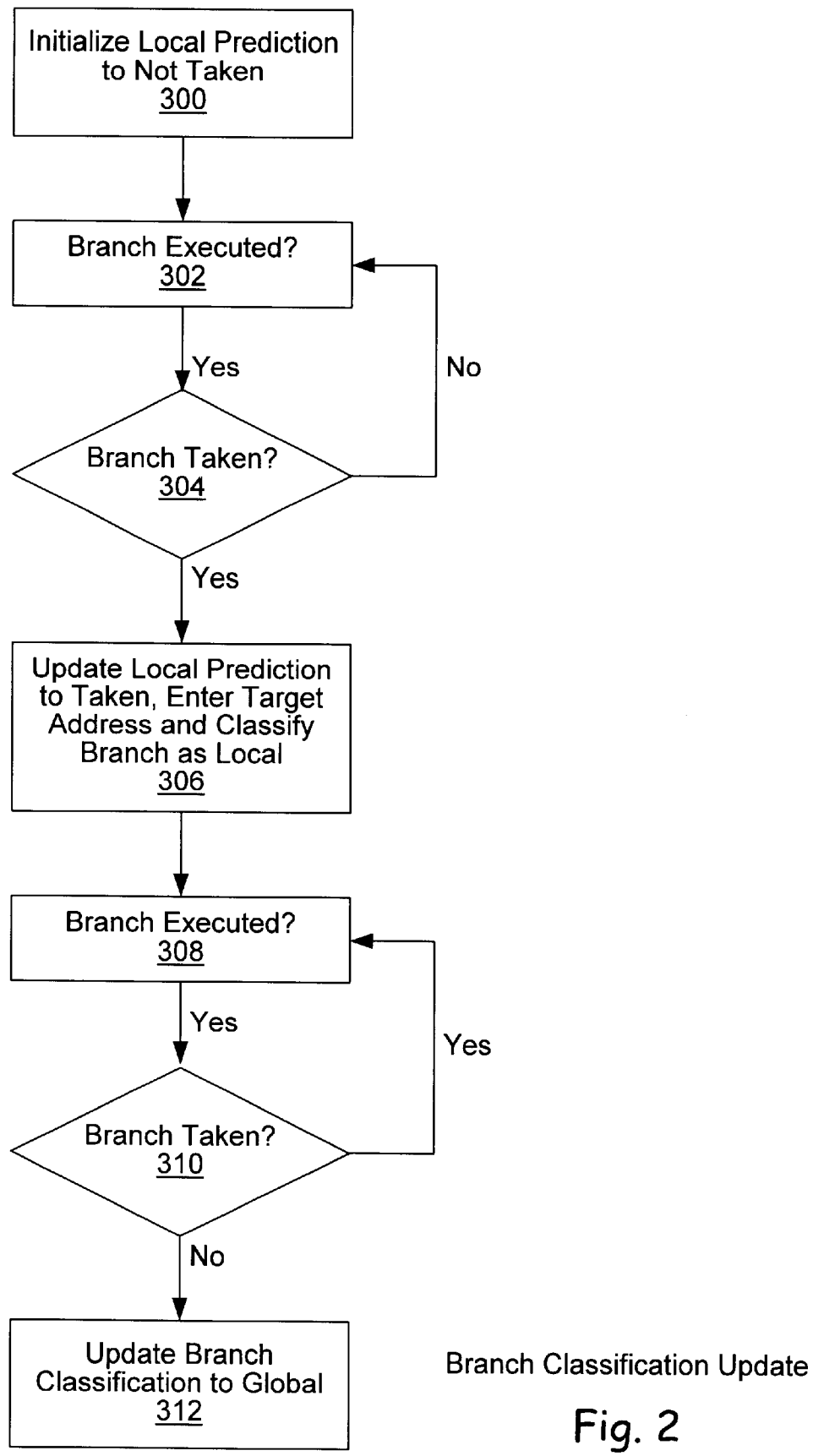
FIG. 2 is a flowchart illustrating a branch classification scheme.

Turning now to FIG. 2, a flowchart illustrating one embodiment of the basic flow of branch classification and prediction is shown. Other embodiments are possible and are contemplated. In the embodiment of FIG. 2, when a conditional branch is initially detected, an entry is created in a local predictor storage indicating the branch is not taken (block 300). Upon execution (block 302), if the branch is not taken (decision block 304), no update is done. If the branch is taken, the local prediction is updated to taken, a target address is entered in a branch target storage and the branch is classified as local (block 306). Upon execution (block 308), if the branch is taken (decision block 310), no update is done. However, if the branch is not taken, the branch classification is updated to indicate the branch is global (block 312) and the classification may remain global until the branch is deleted from the cache due to a cache line replacement.

Figure 3:
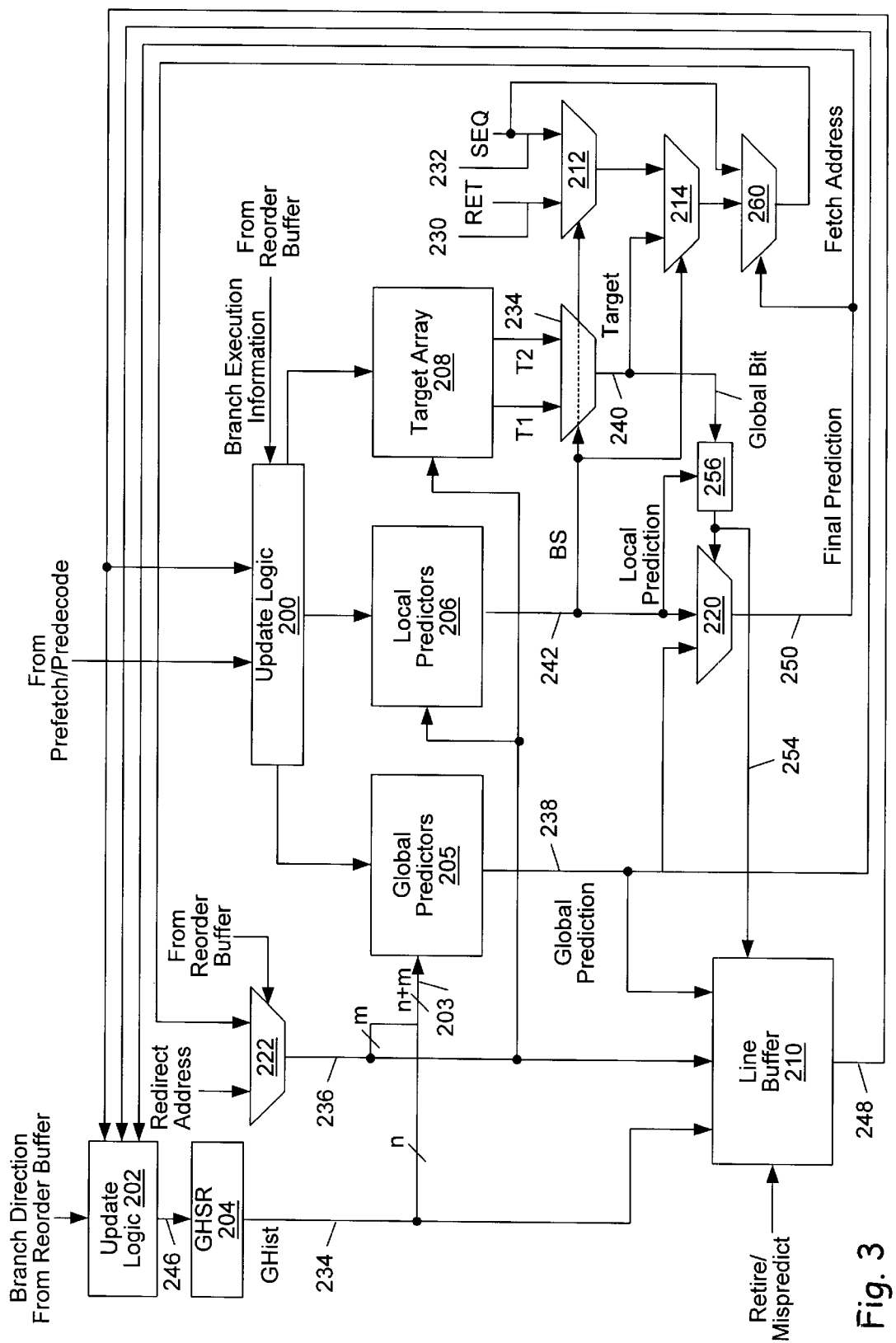
FIG. 3 is a diagram of one embodiment of a branch prediction apparatus included in the microprocessor shown in FIG. 1.

FIG. 3 shows a portion of one embodiment of branch prediction unit 14 is shown. Other embodiments of branch prediction unit 14 in addition to the portion shown in FIG. 3 are contemplated. As shown in FIG. 3, branch prediction unit 14 includes global predictor storage 205, local predictor storage 206, branch target storage 208, update logic 200 and 202, global history shift register 204, line buffer 210, control logic 256 and multiplexors 222, 220, 212, 234, 260 and 214. Global predictor storage 205, local predictor storage 206, branch target storage 208 and line buffer 210 are coupled to a fetch address bus 236 from fetch address multiplexor 222. Global history shift register 204 is coupled to global predictor storage 205 and line buffer 210 via bus 234. Update logic 200 is coupled to global predictor storage 205, local predictor storage 206 and branch target storage 208. Line buffer 210 is coupled to update logic 200 and 202 via bus 248. In addition, update logic 202 is coupled to global history shift register 204 via bus 246. Reorder buffer 32 provides selection control and a redirect address to multiplexor 222. Reorder buffer 32 also provides branch predicted behavior and actual behavior information to update logic 200 and update logic 202. Local predictor storage 206 provides selection control for multiplexors 234, 214 and 212, as well as a local prediction to multiplexor 220 and control logic 256. Multiplexor 234 provides a target address and global bit upon bus 240. The global bit provided on bus 240 is provided to control logic 256. Control logic 256 serves as selection control to multiplexor 220 and conveys a control signal to line buffer 210. Multiplexor 220 provides a final branch prediction on bus 250 which serves as selection control for multiplexor 260 and is also conveyed to update logic 202

In general, the basic operation of the portion of branch prediction unit 14 shown in FIG. 3 is as follows. A fetch address 236 is conveyed to line buffer 210, local predictor storage 206 and target array storage 208 In addition, a portion of the fetch address 236 is combined with global history 234 to form an index into global predictor storage 205. Global predictor storage 205 conveys a global prediction 238, local predictor storage 206 convey a local prediction 242 and target array 208 conveys a target address corresponding to the received fetch address. Local prediction 242 selects a target address from multiplexors 234, 212 and 214 which may be a branch target 240, return address 230 or sequential address 232. In addition, local prediction 242 provides a taken/not taken prediction to multiplexor 220 and control logic 256. Further, branch target 240 may include a global bit which is conveyed to control logic 256. Control logic 256 then conveys a signal 254 which selects either the global prediction 238 or local prediction 242 from multiplexor 220. Control logic 256 selects the global prediction from multiplexor 220 if the local prediction indicates taken and the global bit indicates the branch is classified as global. Otherwise, control logic 256 selects local prediction 242. Signal 254 is also conveyed to line buffer 210 which stores a global history 234, fetch address 236, global prediction 238 and signal 254. Line buffer 210 entry is used to update or repair the branch prediction and global history upon retirement or misprediction. Finally, the final prediction 250 selected by control logic 256 selects the next fetch address from multiplexor 260 which may be either the address conveyed by multiplexor 214 or a sequential address 232

In one embodiment, local predictor storage 206 may be organized in the same manner as instruction cache 16. Data stored in local predictor storage 206 may consist of lines of storage organized in ways. Further, local predictor storage 206 may be ¼ the size of instruction cache 16. Additional bits may be stored along with a local prediction in local predictor storage 206 in order to distinguish entries for multiple fetch addresses which index to the same storage location within local predictor storage 206. In one embodiment, global predictor storage 205 may be configured such that a single storage location provides a prediction for more than one fetch address.

Local—Not Taken Branches

As discussed above, prefetch/predecode unit 12 may be configured to detect branch instructions and to convey branch information corresponding to a branch instruction to branch prediction unit 14. When a conditional branch is detected, update logic 200 may create a corresponding branch prediction entry in local predictor storage 206 initialized to not taken. In one embodiment, local predictor storage 206 may store branch selectors for choosing from among a plurality of branch target addresses stored in branch target storage 208, a sequential address 232, or return stack address 230. Further description of branch selectors is discussed below. Upon creating an entry in local predictor storage 206 for a branch, the predicted direction of the branch is initialized to not taken and the selector is initialized to indicate a sequential address 232. In addition, an entry corresponding to a conditional branch is created in line buffer 210. A line buffer entry may comprise a global history, fetch address, global prediction and global bit.

When a branch has a not taken prediction in local predictor storage 206, a sequential address 232 is conveyed from multiplexor 212 to multiplexor 214. In one embodiment a local prediction of not taken may be conveyed as a binary zero. Control logic 256 then selects the local prediction from multiplexor 220 as the final prediction 250. Final prediction 250 is conveyed to update logic 202 which shifts the predicted direction into global history shift register 204. Final prediction 250 controls multiplexor 260 which gates out the next fetch address. When a local branch prediction entry indicates a branch is predicted not taken, final prediction 250 indicates the branch is not taken and selects sequential address 232 from multiplexor 260 as the next fetch address. On subsequent executions of the branch, prior to the branch prediction entry being deleted from branch prediction unit 14, the predicted direction for the branch is not taken and the sequential address 232 is conveyed as the next fetch address. Upon retirement, the corresponding entry in line buffer 210 is conveyed to update logic 200 and update logic 202 and deleted from line buffer 210. When a line buffer entry indicates a branch is classified as local and reorder buffer 32 indicates the branch was correctly predicted, no update by update logic 200 or 202 is performed. However, if the branch was classified as local and mispredicted, the branch prediction corresponding to the mispredicted branch is updated and the global history shift register 204 is updated as discussed below Local—Taken Branches Upon retirement or mispredict, reorder buffer 32 conveys information regarding the behavior of a branch to update logic 200. Also, line buffer 210 conveys a line buffer entry to update logic 200 and 202. When a line buffer branch entry indicates a branch is classified as local and predicted not taken, and reorder buffer 32 indicates the corresponding branch was mispredicted, update logic 200 updates the branch prediction entry corresponding to the mispredicted branch. Update logic 200 updates the branch prediction in local predictor storage 206 from not taken to taken, enters the branch target address in branch target storage 208 and sets the branch selector to indicate the corresponding target address. A global bit associated with the stored branch target address is initialized to indicate the branch is classified as local, which may be represented by a binary zero. Further, update logic 202 updates the contents of global history shift register 204 to reflect the actual behavior of the mispredicted branch. On subsequent executions of the branch, and prior to the branch prediction entry being deleted from branch prediction unit 14, the branch prediction entry indicates a taken prediction and a classification of local. When a branch is predicted taken and classified as local, the corresponding branch selector stored in local predictor storage 206 selects a target from multiplexors 234 and 212. If the global bit indicates the branch is classified as local, control logic 236 gates out the local prediction 242 from multiplexor 220. The corresponding target address is then gated out of multiplexors 214 and 260 as the fetch address. As before, if the branch is correctly predicted no branch prediction update is required by update logic 200 or 202. On the other hand, if a local predicted taken branch is not taken, the branch prediction entry and global history shift register 204 are updated.

Global Branches

When a branch which is classified as local and predicted taken is mispredicted, update logic 200 updates the global bit corresponding to the mispredicted branch in branch target array 208 to indicate the branch is classified as global. In addition, update logic 200 updates the global prediction entry in global prediction storage 204 corresponding to the mispredicted branch to indicate the branch is predicted not taken. Also, update logic 202 updates global history shift register 204 to indicate the branch was not taken. In one embodiment, global history shift register 204 tracks the behavior of the last 8 global branches.

When a global branch is dispatched, fetch address 236 is conveyed to local predictor storage 206, target array 208 and line buffer 210. In addition, the fetch address is combined with the contents of global history shift register 204 to form an index 203 which is conveyed to global predictor storage 205. The contents of global history shift register 204 are also conveyed to line buffer 210 via bus 234. In one embodiment, index 203 is formed by concatenating the four least significant bits of the fetch address 236 with the contents of global history shift register 204. Other methods of forming an index, such as ORing or XORing, are contemplated as well. The index selects an entry in global predictor storage 205 which is conveyed to line buffer 210, update logic 202 and multiplexor 220. The predicted direction of the branch conveyed by global predictor storage 204 is shifted into the global history shift register 204 by update logic 202 For example, a binary one may represent a taken branch and a binary zero may represent a not taken branch. Further, for a branch classified as global, local predictor storage 206. indicates the branch is predicted taken and the corresponding branch selector gates out the corresponding target addresses from multiplexor 234 and multiplexor 214. Illustration of updating global history shift register 204 is discussed in FIGS. 4–7 below. When a global bit indicates a branch is classified as global, control logic 256 gates out the global branch prediction 238 as the final prediction 250. Final prediction 250 then selects the next fetch address from multiplexor 260. If the global prediction indicates the branch is taken, the target address conveyed from multiplexor 214 is selected as the next fetch address. If the global prediction indicates the branch is not taken, the sequential address 232 is selected from multiplexor 260 as the next fetch address.

Upon retirement, reorder buffer 32 conveys branch information to update logic 200 and update logic 202. In addition, line buffer 210 conveys the corresponding branch information to update logic 202. When reorder buffer 32 indicates a global branch is correctly predicted, update logic 200 modifies global prediction entry 205 to indicate the behavior of the branch. In one embodiment, global branch prediction entries comprise a saturating counter. Such a counter may be two bits which are incremented on taken branches and decremented on not taken branches. Such an indicator may be used to indicate a branch is strongly taken, weakly taken, strongly not taken, or weakly not taken. If a global branch is mispredicted, update logic 200 updates the global prediction entry 205 to indicate the branch behavior. In addition, upon misprediction update logic 202 repairs global history shift register 204 to reflect the actual, rather than the predicted, behavior of the global branch.

Updating Global History Shift Register

FIG. 4 shows the contents of global history shift register 204 before and after a conditional branch is correctly predicted and executed. Shown is an 8 bit shift register at 3 different points in time. Row A indicates a point in time prior to row B, which is prior in time to row C. A taken branch is indicated by a binary one, and a not taken branch is indicated by a binary zero. The arrow on the right indicates values are shifted into the register from the right side with the contents of the register shifting to the left. The leftmost value is shifted out of the register. Row A shows the contents prior to dispatch of a conditional branch. Row B contains the contents after dispatch of a conditional branch. In this case, the conditional branch is predicted taken and a one is shifted into the register. Finally, row C contains the contents after execution of the conditional branch. Because the predicted behavior is correct, no update of the global history shift register 204 is required after execution of the conditional branch.

FIG. 5 illustrates the case of a mispredicted branch. In FIG. 5, row A shows the contents of the global history shift register prior to dispatch of a conditional branch. Row B shows the contents of the register after the dispatch of the conditional branch. Here, as in FIG. 4, the conditional branch is predicted taken and a binary one is shifted into the register. Finally, row C shows the contents of the register after misprediction. In this case, the conditional branch was not taken upon execution. Consequently, the global history register is updated by modifying the history bit representing the mispredicted branch from a binary one to a zero.

FIG. 6 illustrates a mispredicted first conditional branch with a subsequent second conditional branch. Row A shows the contents of global history shift register prior to dispatch of the conditional branches. Row B shows the contents after the first conditional branch has been dispatched and the second conditional branch has been dispatched. In this case, both the first and second conditional branches are predicted taken and two binary ones have been shifted into the register. Upon execution, the first conditional branch is detected to be mispredicted which requires a repair of the global history. Because the mispredicted branch was taken, the second conditional branch represents an erroneous instruction and must be repaired as well. Row C shows the contents of the global history shift register after repair. The state of the register at the time of prediction of the first conditional branch is restored with the history changed from a binary one to a binary zero to reflect the not taken branch. The history of the second conditional branch is no longer present in the history register as it represents an erroneous instruction stream. In this case it was necessary to right-shift the history in the register and restore the history of a branch which was previously left-shifted out.

FIG. 7 is a second example of a mispredicted first conditional branch with a subsequent second conditional branch. In this case, the first conditional branch is predicted taken and the second conditional branch is predicted not taken. As before, the first branch is mispredicted. Upon repair, the state of the register at the time of dispatch of the first branch is restored with the history changed to reflect the not taken behavior of the first branch. As before, the history of the second branch is no longer present. In each of the above cases, the value being shifted into global history shift register 204 represents the final branch prediction 250 or is generated by update logic 202. Update logic 202 generates the appropriate value in response to branch mispredictions.

Branch Selectors

Turning now to FIG. 8, a diagram of an exemplary group of contiguous instruction bytes 50 and a corresponding set of branch selectors 52 in local predictor storage 206 are shown. In FIG. 8, each byte within an instruction is illustrated by a short vertical line (e.g. reference number 54). Additionally, the vertical lines separating instructions in group 50 delimit bytes (e.g. reference number 56). The instructions shown in FIG. 8 are variable in length, and therefore the instruction set including the instructions shown in FIG. 8 is a variable byte length instruction set. In other words, a first instruction within the variable byte length instruction set may occupy a first number of bytes which is different than a second number of bytes occupied by a second instruction within the instruction set. Other instruction sets may be fixed-length, such that each instruction within the instruction set occupies the same number of bytes as each other instruction.

As illustrated in FIG. 8, group 50 includes non-branch instructions IN0–IN5 Instructions IN0, IN3, IN4, and IN5 are two byte instructions. Instruction IN1 is a one byte instruction and instruction IN2 is a three byte instruction. Two predicted taken branch instructions PB0 and PB1 are illustrated as well, each shown as occupying two bytes. It is noted that both non-branch and branch instructions may occupy various numbers of bytes.

The end byte of each predicted-taken branch PB0 and PB1 provides a division of group 50 into three regions: a first region 58, a second region 60, and a third region 62 If a fetch address identifying group 50 is presented, and the offset of the fetch address within the group identifies a byte position within first region 58, then the first predicted-taken branch instruction to be encountered is PB0 and therefore the branch prediction for PB0 is selected by the branch prediction mechanism. Similarly, if the offset of the fetch address identifies a byte within second region 60, the appropriate branch prediction is the branch prediction for PB1. Finally, if the offset of the fetch address identifies a byte within third region 62, then there is no predicted-taken branch instruction within the group of instruction bytes and subsequent to the identified byte. Therefore, the branch prediction for third region 62 is sequential. The sequential address identifies the group of instruction bytes which immediately follows group 50 within main memory.

As used herein, the offset of an address comprises a number of least significant bits of the address. The number is sufficient to provide different encodings of the bits for each byte within the group of bytes to which the offset relates. For example, group 50 is 16 bytes. Therefore, four least significant bits of an address within the group form the offset of the address. The remaining bits of the address identify group 50 from other groups of contiguous instruction bytes within the main memory. Additionally, a number of least significant bits of the remaining bits form an index used by instruction cache 16 to select a row of storage locations which are eligible for storing group 50

Set 52 is an exemplary set of branch selectors for group 50. One branch selector is included for each byte within group 50. The branch selectors within set 52 use the encoding shown in FIG. 20 below. In the example, the branch prediction for PB0 is stored as the second of two branch predictions associated with group 50 (as indicated by a branch selector value of "3"). Therefore, the branch selector for each byte within first region 58 is set to "3". Similarly, the branch prediction for PB1 is stored as the first of the branch predictions (as indicated by a branch selector value of "2"). Therefore, the branch selector for each byte within second region 60 is set to "2". Finally, the sequential branch prediction is indicated by the branch selectors for bytes within third region 62 by a branch selector encoding of "0".

It is noted that, due to the variable byte length nature of the x86 instruction set, a branch instruction may begin within one group of contiguous instruction bytes and end within a second group of contiguous instruction bytes. In such a case, the branch prediction for the branch instruction is stored with the second group of contiguous instruction bytes. Among other things, the bytes of the branch instruction that are stored within the second group of contiguous instruction bytes need to be fetched and dispatched. Forming the branch prediction in the first group of contiguous instruction bytes would cause the bytes of the branch instruction which lie within the second group of instruction bytes not to be fetched.

Employing a set of branch selectors such as set 52 allows for a rapid determination of the predicted fetch address ((i.e. by decoding the offset portion of the fetch address and selecting the corresponding selector from set 52). However, a large number of branch selectors are stored ((i.e. one for each byte). The amount of branch prediction storage employed for storing the branch selectors would correspondingly be large. Still further, a relatively wide selection device (such as a multiplexor) would be needed to select the branch selector in response to the offset of the fetch address. The wider the selection device, in general, the greater the delay in propagating the selected value through the selection device (e.g. the selected branch selector).

FIG. 8 illustrates that the branch selector for each byte within a region is the same, and regions are delimited by branch instructions (more particularly, predicted-taken branch instructions). Branch instructions would generally include at least an opcode (identifying the branch instruction within the instruction set employed by microprocessor 10) and a displacement to be added to the address of the branch instruction (or the address of the instruction immediately following the branch instruction) to form the branch target address. Therefore, a branch instruction occupies at least two bytes. By taking advantage of this fact, the number of branch selectors stored with respect to a group of contiguous instruction bytes may be reduced.

For the remainder of this description, the x86 microprocessor architecture will be used as an example. However, the branch selector technique described herein may be employed within any microprocessor architecture, and such embodiments are contemplated. It is noted that, in the x86 microprocessor architecture, a subroutine return instruction is defined (e.g. the RET instruction). The subroutine return instruction specifies that its branch target address is drawn from the top of the stack indicated by the ESP register. Therefore, the RET instruction is a single byte ((i.e. an opcode byte). Handling of the single byte RET instruction with branch selectors taking advantage of the at least two byte per branch instruction general rule is illustrated in more detail below.

Figure 9:
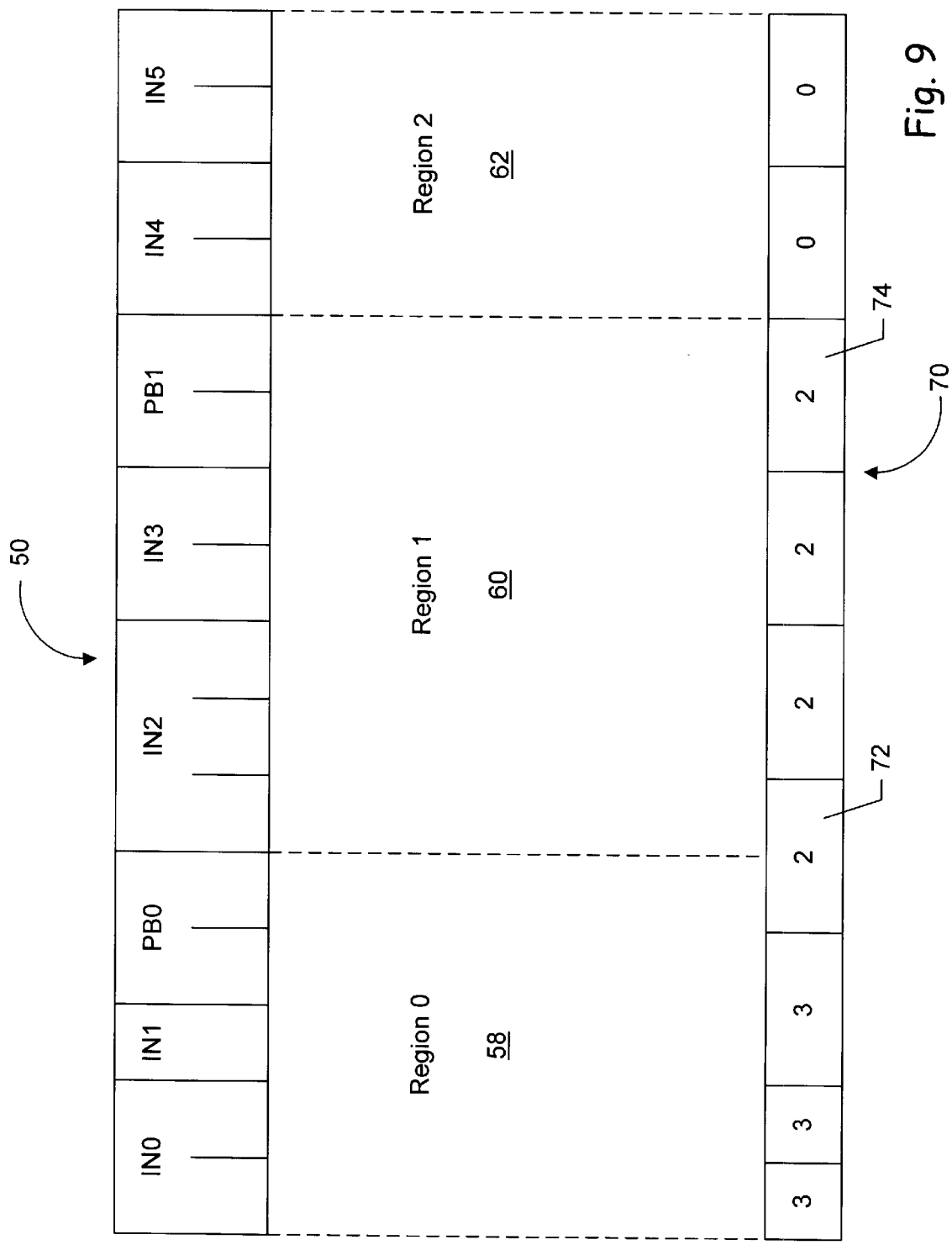

Turning next to FIG. 9, a diagram illustrating group 50, regions 58, 60, and 62, and one embodiment of a set of branch selectors 70 is illustrated. The branch selectors within set 70 correspond to byte ranges defined within group 50. For the example shown in FIG. 14, nine branch selectors are used for a group of 16 contiguous instruction bytes. Set 70 therefore occupies less storage within a branch prediction storage than set 52 shown in FIG. 13 occupies, allowing the branch prediction storage to be made smaller. Still further, a narrower selection device may be used to select a branch selector in response to a fetch address. The selected branch selector may be provided more rapidly, and may thereby provide for a higher frequency implementation in which predicted fetch addresses are provided each clock cycle.

Figure 10:
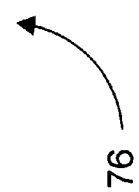
FIG. 10 is a table showing branch selectors and address encoding.

Generally, the largest byte range defined for a given branch selector may be made equal to the shortest branch instruction (excluding the return instruction as described in more detail below). The majority of the byte ranges are selected to be the largest size. However, to handle certain conditions, the embodiment shown in FIG. 9 employs two byte ranges that are smaller than the maximum size. In particular, the initial byte of the group 50 forms a byte range having a single byte (as explained in more detail below with respect to FIG. 11). Since group 50 is an even number of bytes, the byte range corresponding to the initial byte includes only the initial byte, and the largest byte range is two bytes in this example, another byte range is defined to have a single byte as well. For set 70, the byte within group 50 that is contiguous to the initial byte is selected to be a single byte range. This selection allows for a relatively simple decode of the offset of the fetch address to select a branch selector, as illustrated in FIG. 10.

Since the byte ranges are selected to be no larger than the shortest branch instruction, a branch instruction may begin in one byte range and end in a subsequent byte range. However, at most one branch instruction ends in a particular byte range, even if branch instructions are consecutive within a particular group of contiguous instruction bytes. For the case of a branch instruction that ends within a particular byte range but not at the end of the byte range, the branch selector for that byte range is selected to be the branch selector corresponding to instruction bytes subsequent to the branch instruction.

For example, the branch selector for byte range 72 (which includes bytes 3–4, where the initial byte is numbered byte 0) indicates the branch prediction corresponding to predicted branch PB1. The above rule is used because a fetch address within the byte range is not fetching the branch instruction (which begins in the preceding byte range). Therefore, the correct branch prediction is the prediction for the subsequent branch.

On the other hand, if the branch instruction ends at the last byte within the byte range, the branch selector for the byte range is the branch selector corresponding to the branch instruction (e.g. byte range 74). Therefore, if a fetch address specifying predicted branch PB1 ((i.e. the offset is within byte range 74), then the branch prediction used for the fetch is the branch prediction corresponding to branch PB1.

Turning now to FIG. 10, a table 76 is shown corresponding to the selection of byte ranges for branch selectors as illustrated in the example of FIG. 9. The row of table 76 labeled "Byte Position" lists the byte positions within group 50 that correspond to each byte range ((i.e. the offset portion of the address for each byte which is within each byte range). The row labeled "Branch Selector Position" illustrates the branch selector position within the set 70 of the branch selector corresponding to each byte range. The row labeled "Read Addresses" lists the fetch address offsets (in binary) which are decoded to select the branch selector within the corresponding byte range (in order to form a predicted fetch address for the subsequent clock cycle). An "x" in the read addresses indicates a don't care position. Finally, the row labeled "Encoding Addresses" lists the fetch address offsets (in binary) at which a branch instruction can end and still have the branch selector for that byte range indicate the branch prediction corresponding to that branch instruction. For example, branch selector position 2 can indicate the branch prediction for a branch instruction that ends at either byte position 3 or 4. More particularly, a branch instruction which ends at byte position 2 is not represented by the branch selector in branch selector position 2 (because the branch instruction begins in a different byte range than that associated with branch selector position 2, and is therefore not being fetched if the fetch address offset is within the byte range associated with branch selector position 2).

The "Read Addresses" row of table 76 illustrates that a relatively simple decoding of the fetch address offset can be used to select the appropriate branch selector for that fetch address. The decoding for branch selector positions 0 and 1 include each of the fetch address offset bits, but the decoding for the remaining positions may exclude the least significant bit (since it is a don't care). A rapid decode and branch selector selection may be achieved using the allocation of byte ranges illustrated in FIG. 14.

Turning now to FIG. 11, a first example 80 of branch selectors for the byte ranges shown in FIGS. 9 and 10 is shown. Example 80 illustrates the use of the byte range including only byte 0 of a group of contiguous instruction bytes. Example 80 shows an instruction INO ending at byte "E" of a first group of contiguous instruction bytes, a predicted branch PB0 extended from byte "F" of the first group to byte 0 of a second group of contiguous instruction bytes which are sequential to the first group, and an instruction IN1 beginning at byte "1" of the second group.

Since branch instruction PB0 does not end until byte 0 of the second group, the second group needs to be fetched from instruction cache 16. Therefore, the branch selector corresponding to bytes "E" and "F" of the first group indicates sequential, thereby causing the second group to be fetched. The sequential fetch address includes an offset portion set to zero (since bytes immediately subsequent to the last bytes of the first group are being fetched). Therefore, the branch selector corresponding to byte "0" of the second group is selected. The branch selector is coded to select the branch prediction corresponding to branch instruction PB0.

If a bytes 0 and 1 of the second group formed a byte range similar to the other byte ranges shown in FIGS. 9 and 10, branch instruction PB0 would not be predictable. To allow for predictions of branches which extend across groups of instruction bytes, the byte ranges are defined to include a byte range consisting of byte "0" in the present embodiment.

Turning now to FIG. 12, a second example 82 of branch selectors for the byte ranges shown in FIGS. 9 and 10 is shown. Example 82 illustrates a situation in which a predicted branch instruction PB0 is followed by a return instruction RET. Branch instruction PB0 ends at byte "4", which is within the byte range corresponding to branch selector position 3 ((i.e. byte "4" is not the last byte in the byte range). Therefore, the branch selector at branch selector position 3 does not select the branch prediction for PB0, as noted above regarding a branch instruction which ends within a byte range. The RET instruction does end at the last byte of the byte range. Therefore, the branch selector for branch selector position 3 indicates the return instruction ((i.e. an encoding of "1" in example 82).

On the other hand, FIG. 13 illustrates an example 84 in which a return instruction is not predicted. Example 84 includes a predicted branch instruction PB0, a return instruction RET, and an instruction IN1. Branch instruction PB0 ends at the last byte of the byte range corresponding to branch selector position 2, and therefore the corresponding branch selector is encoded to select the branch prediction corresponding to branch instruction PB0. The return instruction ends within the byte range corresponding to branch selector position 3, and therefore the corresponding branch selector does not indicate the return instruction. In this manner, if instruction IN0 is indicated by the fetch address, the return instruction will not be erroneously predicted by the branch selector at branch selector position 3. However, if the return instruction is the byte indicated by the fetch address, an incorrect prediction results.

It is noted that the code sequence shown in example 84 may be uncommon, because often times temporary variables are popped from the stack just prior to executing a return instruction. Therefore, a predicted taken branch would not often immediately precede a return instruction.

FIG. 14 illustrates an example 86 of in which a return instruction may be mispredicted. In example 86, a return instruction is followed immediately by a predicted branch instruction PB0. This code sequence may again be infrequent, since the only way to execute branch instruction PB0 is to branch directly to the instruction from elsewhere in the code sequence. Also, the return instruction is only mispredicted in example 86 if branched to directly. If instruction IN0 is fetched and executed, the return instruction is correctly predicted.

Turning next to FIG. 15, a table 138 illustrating an exemplary branch selector encoding is shown. A binary encoding is listed (most significant bit first), followed by the branch prediction which is selected when the branch selector is encoded with the corresponding value. As table 138 illustrates, the least significant bit of the branch selector can be used as a selection control for branch prediction multiplexor 234 and sequential/return multiplexor 212. If the least significant bit is clear, then the first branch prediction is selected by branch prediction multiplexor 234 and the sequential address is selected by sequential/return multiplexor 212. On the other hand, the second branch prediction is selected by branch prediction multiplexor 234 and the return address is selected by sequential/return multiplexor 212 if the least significant bit is clear. Furthermore, the most significant bit of the branch selector can be used as a selection control for multiplexor 214. If the most significant bit is set, the output of branch prediction multiplexor 234 is selected. If the most significant bit is clear, the output of sequential/return multiplexor 212 is selected.

In one embodiment of local predictor storage 206 and target array storage 208, only two branch predictions per line may be made. Consequently, if two branches in a line are currently predicted taken, other branches in the same line must be predicted not taken. Further, in one embodiment only one branch prediction may be made per fetched line of contiguous instruction bytes. In order to enable a second branch prediction for a fetched line of instructions, a bit associated with the line of instructions is included.

Ordinarily, when there is only a local branch prediction and no global branch prediction, there is no need for a second prediction. In the case of a predicted taken branch where there is no subsequent global prediction which may override the local prediction, the branch will remain predicted taken and the next fetch address will reflect the taken prediction. Consequently, if there is a subsequent branch in the same line, there is no need to predict its behavior because the instruction stream has been redirected before reaching the second branch. On the other hand, if there is a subsequent global prediction which may override the local prediction, it is possible the local prediction of taken may be overridden by a global prediction of not taken. In this situation, a subsequent second branch in the same line will be encountered and it would be more efficient to be able to predict its behavior.

Figure 16:
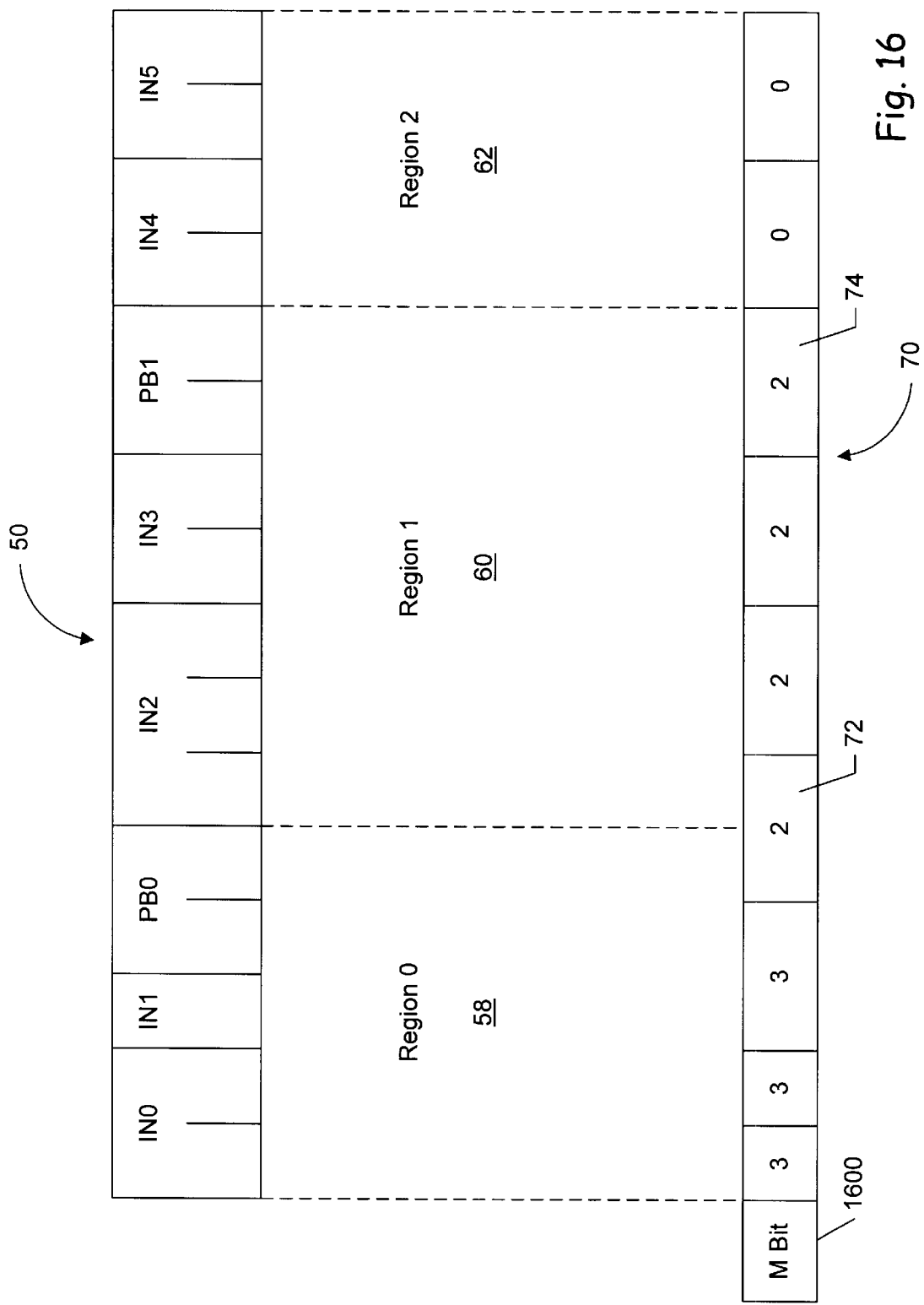
FIG. 16 show an embodiment of a group of contiguous bytes of instructions and corresponding branch selectors with an added multiple branch indicator bit.

FIG. 16 shows a branch selector storage as in FIG. 9, with the added M bit 1600 to indicate a multiple branch condition. Upon entering branch selectors into local predictor storage 206, the associated M bit is initialized to indicate a multiple branch condition does not exist. In FIG. 16, two predicted taken branches are shown, PB0 and PB1. If PB0 is a global branch as indicated by the global bit stored with the corresponding target in target array storage 208 and the M bit 1600 is set to indicate a multiple branch condition and PB0 is predicted not taken by global predictor 205, control logic will force the next fetch address to the address following PB0. This causes a second fetch for the same line at IN2 and allows for prediction of the next branch PB1. Advantageously, prediction for the second branch PB1 is made possible as further discussed below.

Figure 17:
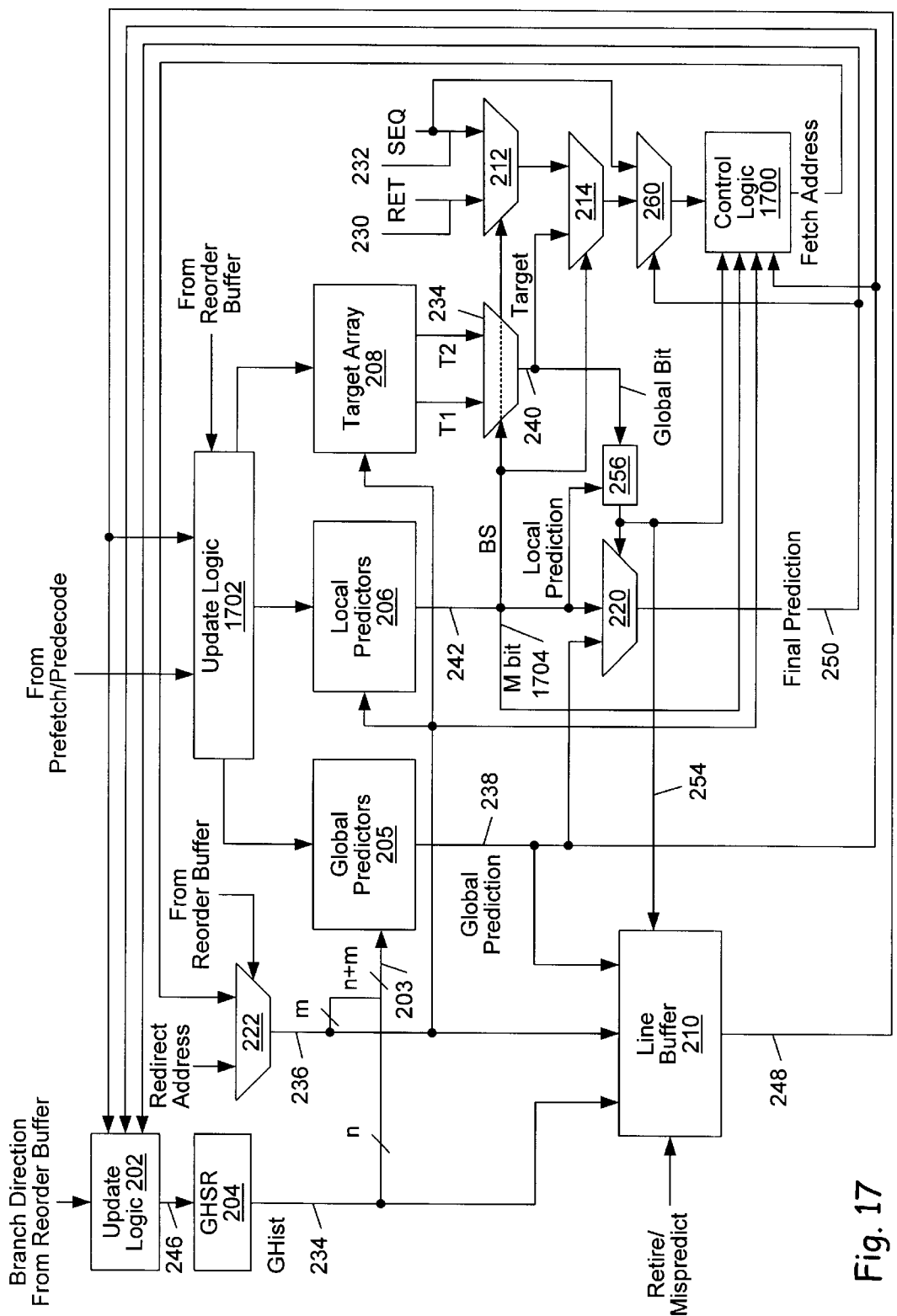
FIG. 17 shows a portion of the branch prediction apparatus shown in FIG. 3 used for generating a second fetch.

FIG. 17 shows a portion of one embodiment of branch prediction unit 14 incorporating a second fetch/prediction apparatus. FIG. 17 corresponds to FIG. 3, with the exception of control logic 1700 and control logic 1702. Control logic 1700 is coupled to multiplexor 260 whereby it receives a next fetch address in the manner discussed in FIG. 3. Control logic 1700 is also coupled to receive a signal from control logic 256, M bit 1704, fetch address 236 and a global prediction 238. Control logic 1700 conveys a fetch address to multiplexor 222. Update logic 1702 is coupled to line buffer 210, prefetch/predecode unit 12, global predictor storage 205, local predictor storage 206, target array 208 and reorder buffer 32

Update logic 1702 operates generally in the same manner as update logic 200 shown in FIG. 3. However, in addition, update logic 1702 includes circuitry to update local predictor storage 206 to indicate groups of instructions with multiple branch conditions as discussed above. Upon mispredict of a branch, update logic 1702 scans the group of instructions containing the mispredicted branch. If the update logic 1702 detects two branches in the line and the first branch is classified as global, update logic 1702 sets the M bit 1704 associated with the line to indicate a multiple branch condition. On subsequent executions of the first branch, control logic 1700 selects as the fetch address either the address conveyed by multiplexor 260 or the address of the instruction immediately following the branch instruction. When an instruction having a branch selector corresponding to the above mentioned first branch is dispatched, control logic 1700 receives the fetch address, M bit 1704, control logic signal 256 and global prediction. If the branch is classified as global, predicted not taken by global prediction 238 and the M bit 1704 indicates a multiple branch condition, control logic 1700 conveys the address immediately following the first branch instruction as the fetch address. Otherwise, control logic 1700 conveys the address received from multiplexor 260 as the next fetch address. Advantageously, multiple branch predictions may be made for a single group of instructions.

Other embodiments of reorder buffer 32 may not employ the line oriented structure described above. Instead, individual storage locations may be allocated to each instruction, with tags assigned in numerically increasing order. If a dependency is detected among concurrently dispatched instructions, the relative position of the dependency may be subtracted from the instruction tag to generate the tag of the dependency.

Figure 18:
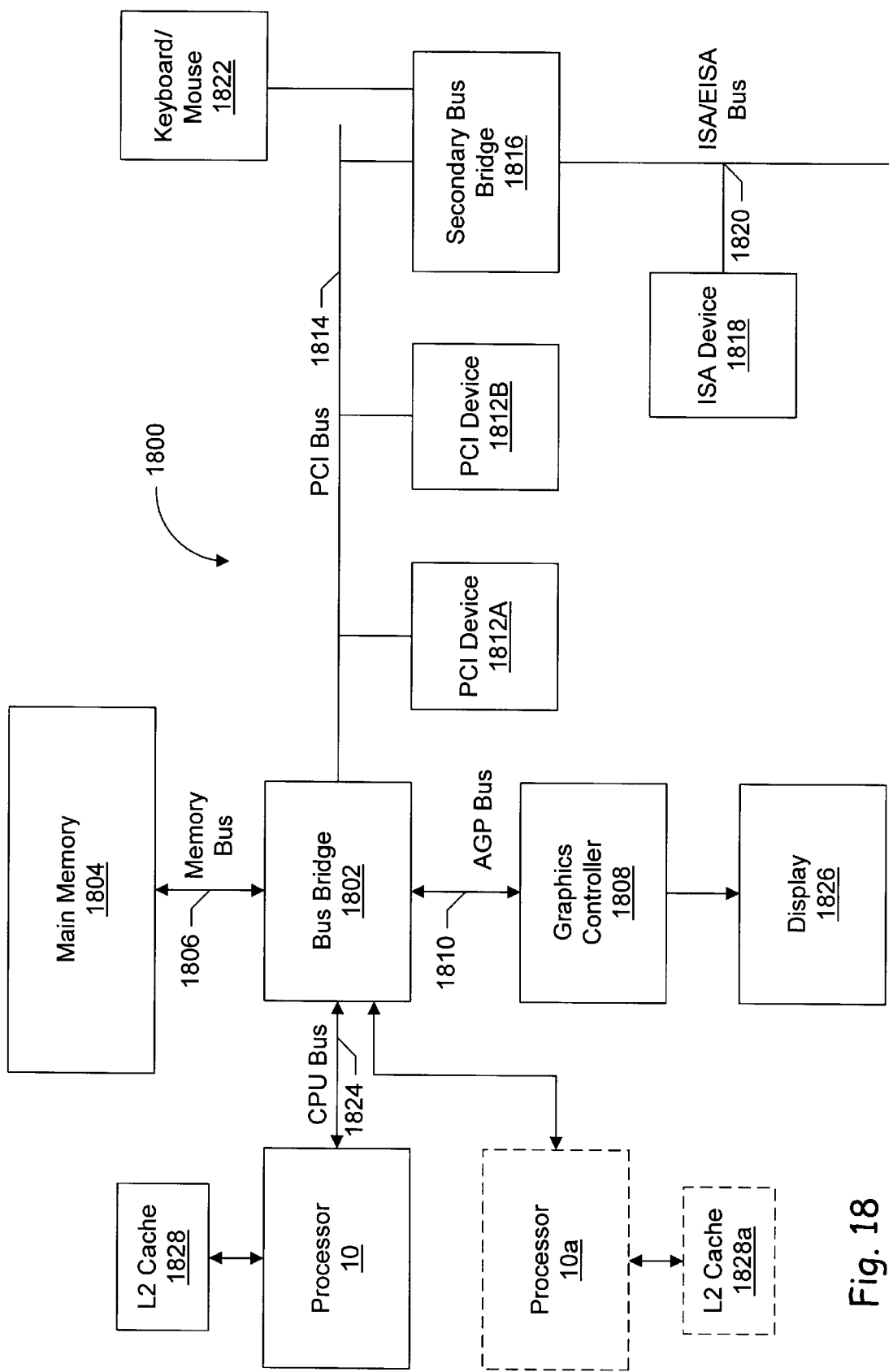
FIG. 18 is a block diagram of one embodiment of a computer system including the microprocessor shown in FIG. 1.

Turning now to FIG. 18, a block diagram of one embodiment of a computer system 1800 including processor 10 coupled to a variety of system components through a bus bridge 1802 is shown. Other embodiments are possible and contemplated. In the depicted system, a main memory 1804 is coupled to bus bridge 1802 through a memory bus 1806, and a graphics controller 1808 is coupled to bus bridge 1802 through an AGP bus 1810. Finally, a plurality of PCI devices 1812A–1812B are coupled to bus bridge 1802 through a PCI bus 1814. A secondary bus bridge 1816 may further be provided to accommodate an electrical interface to one or more EISA or ISA devices 1818 through an EISA/ISA bus 1820. Processor 10 is coupled to bus bridge 1802 through a CPU bus 1824 and to an optional L2 cache 1828.

Bus bridge 1802 provides an interface between processor 10, main memory 1804, graphics controller 1808, and devices attached to PCI bus 1814. When an operation is received from one of the devices connected to bus bridge 1802, bus bridge 1802 identifies the target of the operation (e.g. a particular device or, in the case of PCI bus 1814, that the target is on PCI bus 1814). Bus bridge 1802 routes the operation to the targeted device. Bus bridge 1802 generally translates an operation from the protocol used by the source device or bus to the protocol used by the target device or bus.

In addition to providing an interface to an ISA/EISA bus for PCI bus 1814, secondary bus bridge 1816 may further incorporate additional functionality, as desired. An input/output controller (not shown), either external from or integrated with secondary bus bridge 1816, may also be included within computer system 1800 to provide operational support for a keyboard and mouse 1822 and for various serial and parallel ports, as desired. An external cache unit (not shown) may further be coupled to CPU bus 1824 between processor 10 and bus bridge 1802 in other embodiments. Alternatively, the external cache may be coupled to bus bridge 1802 and cache control logic for the external cache may be integrated into bus bridge 1802. L2 cache 1828 is further shown in a backside configuration to processor 10. It is noted that L2 cache 1828 may be separate from processor 10, integrated into a cartridge (e.g. slot 1 or slot A) with processor 10, or even integerated onto a semiconductor substrate with processor 10

Main memory 1804 is a memory in which application programs are stored and from which processor 10 primarily executes. A suitable main memory 1804 comprises DRAM (Dynamic Random Access Memory). For example, a plurality of banks of SDRAM (Synchronous DRAM) or Rambus DRAM (RDRAM) may be suitable.

PCI devices 1812A–1812B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 1818 is illustrative of various types of peripheral devices, such as a modem, a sound card, and a variety of data acquisition cards such as GPIB or field bus interface cards.

Graphics controller 1808 is provided to control the rendering of text and images on a display 1826. Graphics controller 1808 may embody a typical graphics accelerator generally known in the art to render three-dimensional data structures which can be effectively shifted into and from main memory 1804. Graphics controller 1808 may therefore be a master of AGP bus 1810 in that it can request and receive access to a target interface within bus bridge 1802 to thereby obtain access to main memory 1804. A dedicated graphics bus accommodates rapid retrieval of data from main memory 1804 For certain operations, graphics controller 1808 may further be configured to generate PCI protocol transactions on AGP bus 1810. The AGP interface of bus bridge 1802 may thus include functionality to support both AGP protocol transactions as well as PCI protocol target and initiator transactions. Display 1826 is any electronic display upon which an image or text can be presented. A suitable display 1826 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 1800 may be a multi-processing computer system including additional processors (e.g. processor 10*a* shown as an optional component of computer system 1800). Processor 10*a* may be similar to processor 10. More particularly, processor 10*a* may be an identical copy of processor 10. Processor 10*a* may be connected to bus bridge 1802 via an independent bus (as shown in FIG. 5) or may share CPU bus 1824 with processor 10. Furthermore, processor 10*a* may be coupled to an optional L2 cache 1828*a* similar to L2 cache 1828.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A branch prediction mechanism comprising:
a local branch prediction storage coupled to receive a fetch address, wherein said fetch address corresponds to a group of contiguous instruction bytes being fetched from an instruction cache, wherein said local branch prediction storage is configured to convey a local branch prediction; and
a global branch prediction storage coupled to receive said fetch address and a global history, wherein said fetch address and said global history are combined to form an index, and wherein said index is used to select a global branch prediction from said global branch prediction storage; and
a branch target storage coupled to receive said fetch address, wherein said target storage is configured to store a branch target address corresponding to said fetch address, wherein said target storage is configured to store a classification indicator corresponding to a branch having said branch target address, and wherein said indicator is initialized to indicate said branch is a local branch, and wherein said indicator is updated to indicate said branch is a global branch in response to detecting a first condition; and
a selection device configured to select said local branch prediction in response to detecting said indicator indicates said branch is a local branch, and wherein said selection device is configured to select said global branch prediction in response to detecting said indicator indicates said branch is a global branch.

2. The branch prediction mechanism of claim 1, wherein said local branch prediction comprises a branch selector.

3. The branch prediction mechanism of claim 1, wherein said global branch prediction comprises a predicted branch direction, wherein said predicted branch direction comprises a two bit saturating counter.

4. The branch prediction mechanism of claim 1, further comprising a global history shift register configured to store said global history, wherein said global history shift register is configured to record a direction of a conditional branch.

5. The branch prediction mechanism of claim 4, wherein said recording comprises shifting a bit into said global history shift register, wherein said bit corresponds to a most recently dispatched conditional branch, wherein said bit indicates a predicted direction of said conditional branch, and wherein said global history shift register is updated to reflect the actual behavior of said conditional branch.

6. The branch prediction mechanism of claim 5, further comprising an update logic, wherein said update logic is configured to perform said update in response to detecting a misprediction of said conditional branch.

7. The branch prediction mechanism of claim 1, wherein a multiple branch indicator associated with said group of contiguous instruction bytes is stored in said local branch prediction storage, wherein said indicator is initialized to indicate no multiple branch condition exists.

8. The branch prediction mechanism of claim 7, wherein said indicator is updated to indicate a multiple branch condition exists, in response to detecting a mispredicted branch, wherein said mispredicted branch is among said group of contiguous instruction bytes, wherein a plurality of branches are detected among said group of contiguous instruction bytes, and wherein a global branch is detected among said plurality of branches, and wherein said global branch is not the last branch in program order of said plurality of branches.

9. The branch prediction mechanism of claim 7, wherein a predicted target address for a branch prediction corresponding to said branch instruction is a sequential address, in response to detecting a predicted not taken global branch, wherein said indicator indicates no multiple branch condition exists, and wherein a predicted target address for said branch prediction is an address corresponding to a instruction within said group of instruction immediately following said branch instruction, in response to detecting said branch is a predicted not taken global branch, wherein said indicator indicates a multiple branch condition exists.

10. A method comprising:
detecting an instruction is a conditional branch; and
initializing a local branch prediction corresponding to said conditional branch to indicate said conditional branch is predicted not taken; and
updating said local branch prediction to indicate said conditional branch is predicted taken, and wherein a branch classification for said conditional branch is initialized to indicate said branch is local, in response to detecting a misprediction of said conditional branch as predicted not taken;
updating said branch classification to indicate said branch is global, in response to detecting a misprediction of said conditional branch as predicted taken;

predicting said conditional branch using a local branch prediction in response to detecting said branch prediction indicates not taken;

predicting said conditional branch using a local branch prediction in response to detecting said conditional branch is classified as local; and predicting said conditional branch using a global branch prediction in response to detecting said conditional branch is classified as global.

11. A method comprising:

detecting an instruction is a conditional branch, and initializing a local branch prediction corresponding to said conditional branch to indicate said conditional branch is predicted not taken; and updating said local branch prediction to indicate said conditional branch is predicted taken, and wherein a branch classification for said conditional branch is initialized to indicate said branch is local, in response to detecting a r misprediction of said conditional branch as predicted not taken;

updating said branch classification to indicate said branch is global, in response to detecting a misprediction of said conditional branch as predicted taken; and storing a multiple branch indicator associated with a contiguous group of instructions, wherein said indicator is initialized to indicate a multiple branch condition does not exist.

12. The method of claim 11, further comprising updating said indicator to indicate a multiple branch condition exists, in response to detecting a mispredicted branch, wherein said mispredicted branch is among said group of instructions, wherein a plurality of branches are detected among said group of instructions, and wherein a global branch is detected among said plurality of branches, and wherein said global branch is, not the last branch in program order of said plurality of branches.

13. A computer system comprising:

a processor including a branch prediction mechanism, wherein said branch prediction mechanism comprises a local branch prediction storage coupled to receive a fetch address, wherein said fetch address corresponds to a group of contiguous instruction bytes being fetched from an instruction cache, wherein said local branch prediction storage is configured to convey a local branch prediction; and a global branch prediction storage coupled to receive said fetch address and a global history, wherein said fetch address and said global history are combined to form an index, and wherein said index is used to select a global branch prediction from said global branch prediction storage; and a branch target storage coupled to receive said fetch address, wherein said target storage is configured to store a branch target address corresponding to said fetch address, wherein said target storage is configured to store a classification indicator corresponding to a branch having said branch target address, and wherein said indicator is initialized to indicate said branch is a local branch, and wherein said indicator is updated to indicate said branch is a global branch in response to detecting a first condition; and a selection device configured to select said local branch prediction in response to detecting said indicator indicates said branch is a local branch, and wherein said selection device is configured to select said global branch prediction in response to detecting said indicator indicates said branch is a global branch. ; and an input/output (I/O) device configured to communicate between said computer system and another computer system to which said I/O device is couplable.

14. The computer system as recited in claim 13 wherein said I/O device is a modem.

15. A method comprising:

detecting an instruction is a conditional branch; and initializing a local branch prediction corresponding to said conditional branch to indicate said conditional branch is predicted not taken; and updating said local branch prediction to indicate said conditional branch is predicted taken, and wherein a branch classification for said conditional branch is initialized to indicate said branch is local, in response to detecting a misprediction of said conditional branch as predicted not taken;

updating said branch classification to indicate said branch is global, in response to detecting a misprediction of said conditional branch as predicted taken;

selecting a sequential address as a next fetch address in response to detecting a predicted not taken global branch, wherein said indicator indicates no multiple branch condition exists; and selecting an address corresponding to an instruction immediately following said branch instruction within said group of instructions, in response to detecting a predicted not taken global branch, wherein said indicator indicates a multiple branch condition exists.

16. A method comprising:

detecting an instruction is a conditional branch; and initializing a local branch prediction corresponding to said conditional branch to indicate said conditional branch is predicted not taken; and updating said local branch prediction to indicate said conditional branch is predicted taken, and wherein a branch classification for said conditional branch is initialized to indicate said branch is local, in response to detecting a misprediction of said conditional branch as predicted not taken;

updating said branch classification to indicate said branch is global, in response to detecting a misprediction of said conditional branch as predicted taken; and storing a history of said conditional branch in a global history storage, wherein said global history storage comprises a global history shift register.

17. A method comprising:

detecting an instruction is a conditional branch; and initializing a local branch prediction corresponding to said conditional branch to indicate said conditional branch is predicted not taken; and updating said local branch prediction to indicate said conditional branch is predicted taken, and wherein a branch classification for said conditional branch is initialized to indicate said branch is local, in response to detecting a misprediction of said conditional branch as predicted not taken;

updating said branch classification to indicate said branch is global, in response to detecting a misprediction of said conditional branch as predicted taken; and storing a history of said conditional branch in a global history storage, wherein said storing comprises shifting a bit into said global history shift register, wherein said bit corresponds to a most recently dispatched global branch, wherein said bit indicates a predicted direction of said global branch.

18. A method comprising:

detecting an instruction is a conditional branch; and initializing a local branch prediction corresponding to said conditional branch to indicate said conditional branch is predicted not taken; and updating said local branch prediction to indicate said conditional branch is predicted taken, and wherein a branch classification for said conditional branch is initialized to indicate said branch is local, in response to detecting a misprediction of said conditional branch as predicted not taken;

updating said branch classification to indicate said branch is global, in response to detecting a misprediction of said conditional branch as predicted taken;

storing a history of said conditional branch in a global history storage; and updating said history in response to detecting a misprediction of said global branch, wherein said update modifies said global history storage to reflect an actual behavior of said conditional branch.

19. A method comprising:

detecting an instruction is a conditional branch; and initializing a local branch prediction corresponding to said conditional branch to indicate said conditional branch is predicted not taken; and updating said local branch prediction to indicate said conditional branch is predicted taken, and wherein a branch classification for said conditional branch is initialized to indicate said branch is local, in response to detecting a misprediction of said conditional branch as predicted not taken;

updating said branch classification to indicate said branch is global, in response to detecting a misprediction of said conditional branch as predicted taken;

storing said classification indicator in a branch target storage, said storage being coupled to receive a fetch address and store a branch target address corresponding to said fetch address;

selecting said local branch prediction in response to detecting said indicator indicates said branch is a local branch; and selecting a global branch prediction from a global branch prediction storage in response to detecting said indicator indicates said branch is a global branch.

* * * * *